(12) United States Patent
Handt et al.

(10) Patent No.: US 11,626,727 B2
(45) Date of Patent: Apr. 11, 2023

(54) ENERGY SUPPLY NETWORK

(71) Applicant: Siemens Energy Global GmbH & Co. KG, Bayern (DE)

(72) Inventors: Karsten Handt, Berg (DE); Sebastian Nielebock, Forchheim (DE); Markus Pfeifer, Nuremberg (DE); Jens Weidauer, Fürth (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/428,180

(22) PCT Filed: Feb. 12, 2020

(86) PCT No.: PCT/EP2020/053544
§ 371 (c)(1),
(2) Date: Aug. 3, 2021

(87) PCT Pub. No.: WO2020/165216
PCT Pub. Date: Aug. 20, 2020

(65) Prior Publication Data
US 2022/0123551 A1 Apr. 21, 2022

(30) Foreign Application Priority Data

Feb. 15, 2019 (EP) ..................... 19157422

(51) Int. Cl.
*H02J 1/02* (2006.01)
(52) U.S. Cl.
CPC ..................... *H02J 1/02* (2013.01)
(58) Field of Classification Search
CPC ....................................... H02J 1/02
(Continued)

(56) References Cited

U.S. PATENT DOCUMENTS 7,049,710 B2 * 5/2006 Dahlman ............... H02J 7/345
307/20

FOREIGN PATENT DOCUMENTS

WO 2017066985 A1 4/2017

OTHER PUBLICATIONS

Kyritsis et al: "A novel Parallel Active Filter for Current Pulsation Smoothing on Single Stage Grid-connected AC-PV Modules" p. 309466925, XP055159769, Found on the Internet: URL:http://ieeexplore.ieee.org/elx5/4417196/4417197/04417545.pdf?tp=&arnumber=44175 45&isnumber=4417197, p. 2, line 35-p. 4, line 12; fig. 1-3; Dec. 19, 2014.

(Continued)

*Primary Examiner* — Hal Kaplan
(74) *Attorney, Agent, or Firm* — Wolter Van Dyke Davis, PLLC

(57) ABSTRACT

An energy supply network has a bus line with a line impedance for energy distribution. The energy supply network also includes a number of power-electronic converters having a respective commutation capacitor wherein the storage capacity thereof is selected in such a way that a controlling of the associated power-electronic converter is guaranteed during operation of the energy supply network and an excess of voltage is managed during a commutation. At least one energy accumulator is provided, which can be connected selectively to the bus line by controlling a switch device via a computer unit, wherein the storage capacity of the energy accumulator is substantially greater than the storage capacity of a respective commutation capacitor.

11 Claims, 1 Drawing Sheet

(58) Field of Classification Search
USPC .......................................................... 307/109
See application file for complete search history.

(56) References Cited

OTHER PUBLICATIONS

PCT International Search Report and Written Opinion of International Searching Authority dated May 12, 2021 corresponding to PCT International Application No. PCT/EP2020/053544 filed Feb. 12, 2020.

* cited by examiner ized such that, in the event of a malfunction, an energy storage facility is provided, the resonant frequency is displaced downwards in an unwanted manner.

ENERGY SUPPLY NETWORK

CROSS REFERENCE TO RELATED APPLICATIONS

This application is the US National Stage of International Application No. PCT/EP2020/053544 filed 12 Feb. 2020, and claims the benefit thereof. The International Application claims the benefit of European Application No EP19157422 filed 15 Feb. 2019. All of the applications are incorporated by reference herein in their entirety.

FIELD OF INVENTION

The invention relates to an energy supply network comprising a bus line with a line impedance for energy distribution, and a number of power electronic converters having a respective commutation capacitance.

BACKGROUND OF INVENTION

Energy supply networks are employed for the supply of energy to industrial installations and buildings. A majority of electrical components, whether energy generators, energy consumers or energy accumulators, are connected to the bus line of the energy supply network with the interposition of an associated power electronic converter (or "power converter").

Power electronic converters customarily comprise an intermediate voltage circuit having an intermediate circuit capacitance which, in combination with the line impedance of the bus line of the energy supply network, constitutes an oscillating system. The intermediate circuit capacitance of the intermediate voltage circuit is firstly required to assume an energy storage function in the event of a network/installation fault. Secondly, it assumes a voltage smoothing function, thus permitting the reliable operation of a control function of the associated power electronic converter.

In the light of the necessity for the assumption of an energy storage function in the event of a malfunction, power electronic converters of an energy supply network which are known from the prior art are rated with a storage capacity of sufficient magnitude to permit the bridging of a power failure of several milliseconds, at a given rated load. The storage capacity varies according to the power category present and, in an interconnected system, can be a number of mF. With line lengths of the bus line within the range of a few meters up to a few hundred meters, resonant frequencies from a three-figure hertz range up to single-figure kilohertz range are achieved. Owing to various switching operations such as, e.g. the disconnection or connection of electrical components of the energy supply network, or on account of dynamic target value adjustments, the excitation of resonances in the above-mentioned frequency range can occur.

SUMMARY OF INVENTION

One object in the design of an energy supply network is the definition of the resonant frequency within a specific range, advantageously in the two-/three-figure kilohertz range, such that load cycles in the energy supply network do not result in oscillations. However, as a result of the necessity for the intermediate circuit capacitance of a respective power electronic converter to be dimensioned such that, in the event of a malfunction, an energy storage facility is provided, the resonant frequency is displaced downwards in an unwanted manner.

Currently available power electronic converters thus restrict the maximum expansion of the energy supply network, particularly of the bus line, with a simultaneous limitation of the maximum storage capacity of the intermediate circuit capacitance, in order to permit the achievement of the independent and stable control of the individual power electronic converters.

If the energy supply network is static, as is the case e.g. in separate networks, a system simulation can also be executed beforehand, in order for conclusions to be drawn with respect to the stability of the energy supply network, and the parameterization thereof.

The object of the invention is the provision of an energy supply network in which a resonant frequency is as high as possible, in order to prevent the excitation of oscillations.

This object is fulfilled by an energy supply network in accordance with the features of the independent claim. Advantageous configurations proceed from the dependent patent claims.

An energy supply network is proposed, having a bus line with a line impedance for energy distribution, and a number of power electronic converters having a respective commutation capacitance. The storage capacity (i.e. rating) of a respective commutation capacitance is selected such that, in the operation of the energy supply network, a controlling of the associated power electronic converter is ensured, and any excess voltage associated with commutation is managed. The energy supply network additionally comprises at least one energy accumulator which can be selectively connected to the bus line by controlling a switch device, by means of a computer unit, wherein the storage capacity of the energy accumulator is substantially greater than the storage capacity of a respective commutation capacitance.

By the separation of the individual functions of the intermediate voltage circuit, an optimization of the energy supply network, particularly of a DC voltage network, i.e. an energy supply network, the bus line of which carries a direct voltage (DC voltage), can be ensured. To this end, the power electronic converters assume a minimum input/output capacitance in the form of the commutation capacitance, which minimizes any voltage ripple to the extent that a control function is executed, and any excess voltage associated with commutation is managed. The energy accumulator functionality is executed by means of the controllable energy accumulator, which is selectively connectable to the bus line. This energy accumulator, in addition to the supply of energy in the event of a network power failure or the intermediate storage of rotational energy in the case of energy recovery, can take on the task of stabilizing the energy supply network, in the form of an active filter.

In this manner, it is possible for the resonant frequency of the energy supply network to be increased, wherein the commutation capacitances, which function as the intermediate circuit capacitance, are maintained at a minimum. It is possible for the energy of faults to be reduced, as this energy is accommodated by the energy accumulator which is selectively connectable to the bus line by means of a controllable switch device. In particular, it is also possible for an active filtering of voltage oscillations to be provided, wherein currents in phase opposition to the oscillation are actively injected. A further advantage of the method proposed according to the invention is provided, in that the energy content of the energy accumulator can be fully exploited, on the grounds that, by means of the controllable switch device in the form of a step-up/step-down converter, a further voltage range of the energy accumulator can be exploited, in comparison with an intermediate circuit capacitance of a respective power electronic converter which is dimensioned to a conventional rating, as the intermediate circuit voltage is coupled to the network voltage. In other words, a larger voltage range can be employed. Alternatively, an energy accumulator dimensioned to a lower rating can be used, in order to permit the employment of a functionality of the type which has been achieved previously.

As a result, an active filter having an active intermediate circuit is thus provided, particularly in an energy supply network which is configured in the form of a DC voltage network.

A capacitor, a battery, a supercapacitor (abbreviated as "supercap" or "SC", and sometimes also described as an ultracapacitor) or a flywheel can be employed as an energy accumulator. In principle, any type of energy accumulator which is capable of the take-up or release of high currents in a short time can be considered for use as an energy accumulator.

According to a further appropriate configuration, it is provided that the storage capacity of the commutation capacitance of a respective power electronic converter assumes a value between 10 µF and 100 µF, particularly 10 µF. Conversely, the storage capacity of the energy store is greater than 1 mF, particularly greater than 10 mF.

Appropriately, the switch device is a power electronic converter, particularly a step-up converter or step-down converter. The switch device can also be configured in the form of a hard- or soft-switching insulated converter, such as e.g. a DAB, an SRC, a phase shift converter or similar. The energy accumulator is connected to the output of the switch device or the power electronic converter and, via the latter, is connectable to the bus line in an arrangement which is controllable by the computer unit. In this manner, the switch device, which is controllable by means of the computer unit, can not only assume an energy balancing function, wherein energy is either transmitted to the bus line or is tapped from the bus line, but can also assume an active filtering of voltage oscillations.

It is further appropriate if the switch device comprises a current-limiting unit, particularly for the limitation of short-circuit power. Current limitation is particularly executed by means of the current-regulated operation of the electronic converter, e.g. of the step-up converter.

It is further appropriate if the switch device comprises a filter unit for voltage oscillations. The filter unit for voltage oscillations can be provided by the design of the switch device itself, or can be achieved by means of additional components.

According to a further appropriate configuration, it is provided that the switch device is actuatable by means of the computer unit, such that a predefined quantity of energy can be released from the energy accumulator to the bus line. Alternatively or additionally, the switch device can also be actuatable by means of the computer unit, such that a predefined quantity of energy can be tapped by the energy accumulator from the bus line.

It is further appropriate that the switch device is configured such that the energy accumulator is galvanically isolated from, or galvanically connected to the bus line. Galvanic isolation can be achieved, for example, by means of a transformer.

It is further appropriate that, in the event of a plurality of energy accumulators, the latter are connected to the bus line in a spatially distributed arrangement, by means of associated switch devices.

The invention is described in greater detail hereinafter with reference to an exemplary embodiment represented in the drawing.

DETAILED DESCRIPTION OF INVENTION

Figure 1:
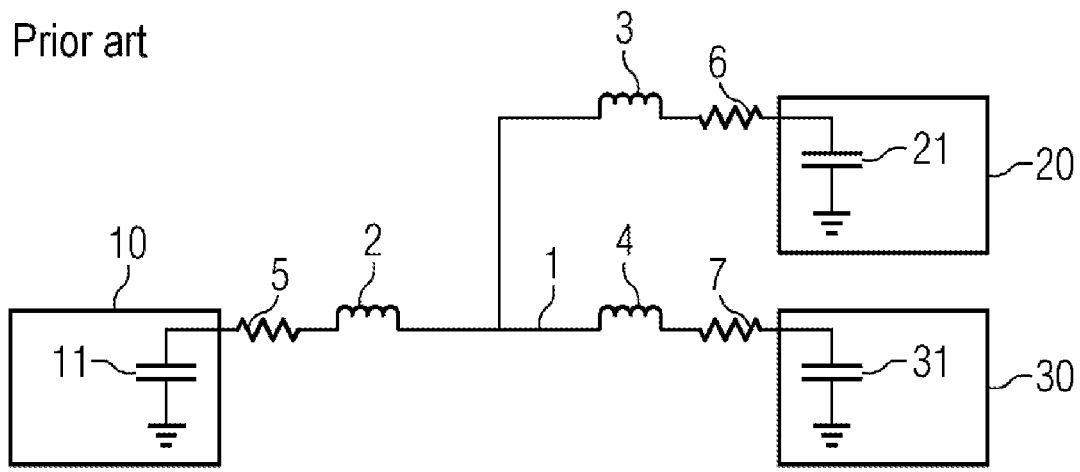
FIG. 1 shows a schematic representation of an exemplary energy supply network which is known from the prior art.

FIG. 1 shows a schematic representation of an exemplary energy supply network which is known from the prior art. In the following description, its assumed that the energy supply network is a DC voltage network.

The energy supply network represented in FIG. 1 comprises a bus line 1, e.g. in the form of a DC conductor rail. The bus line 1 can assume a length ranging from several meters to several hundred meters. A number of components, which are not represented in greater detail, are connected to the bus line 1, wherein the components can be energy generating components, energy consuming components or energy storing components. Each of the components is, for example, connected to the bus line 1 via an associated power electronic converter 10, 20, 30. Depending upon the component concerned, the power electronic converter is either a DC/DC converter, a DC/AC converter, or an AC/DC converter.

Each of the power electronic converters 10, 20, 30, which are also described as power converters, comprises an exemplarily represented intermediate circuit capacitance 11, 21, 31. In combination with a line impedance (reference symbols 2, 3 and 4 in the respective branches of the bus line 1) and likewise exemplarily represented line resistances 5, 6, 7, the intermediate circuit capacitances 11, 21, 31 constitute an oscillating system. The intermediate circuit capacitances 11, 21, 31, in the exemplary embodiment represented in FIG. 1, in addition to voltage smoothing, assume an energy storage function in the event of a malfunction. To this end, the storage capacities of the intermediate circuit capacitances 11, 21, 31 of the conventionally configured power electronic converters 10, 20, 30 are configured such that the storage capacity thereof permits the bridging of a network power failure of several ms, at a given rated load.

In combination, the intermediate circuit capacitances 11, 21, 31 can assume a value of several mF. At line lengths of the bus line 1 in the range of one meter to several hundred meters, accordingly, resonant frequencies in the three-figure hertz range and the single-figure kilohertz range are achieved. These resonances can be excited by various switching operations, e.g. a disconnection or connection of electrical components which are connected to the power electronic converters 10, 20, 30, or by dynamic target value step changes.

As the excitation of resonances is undesirable, the energy supply network represented in greater detail in FIG. 2 and described hereinafter is proposed, which permits the resonant frequency in an energy supply network of this type to be constituted with the highest possible value, thus preventing any load-related excitation of oscillations in the energy supply network.

The energy supply network proposed according to the invention is based upon the consideration that, in an undesired manner, the resonant frequency is lower, the greater the intermediate circuit capacitances of the power electronic converters are. However, as these are dimensioned, as described, in accordance with a requisite energy storage in the event of a malfunction, it has not been possible, in the past, for a reduction of resonant frequencies to be avoided.

Figure 2:
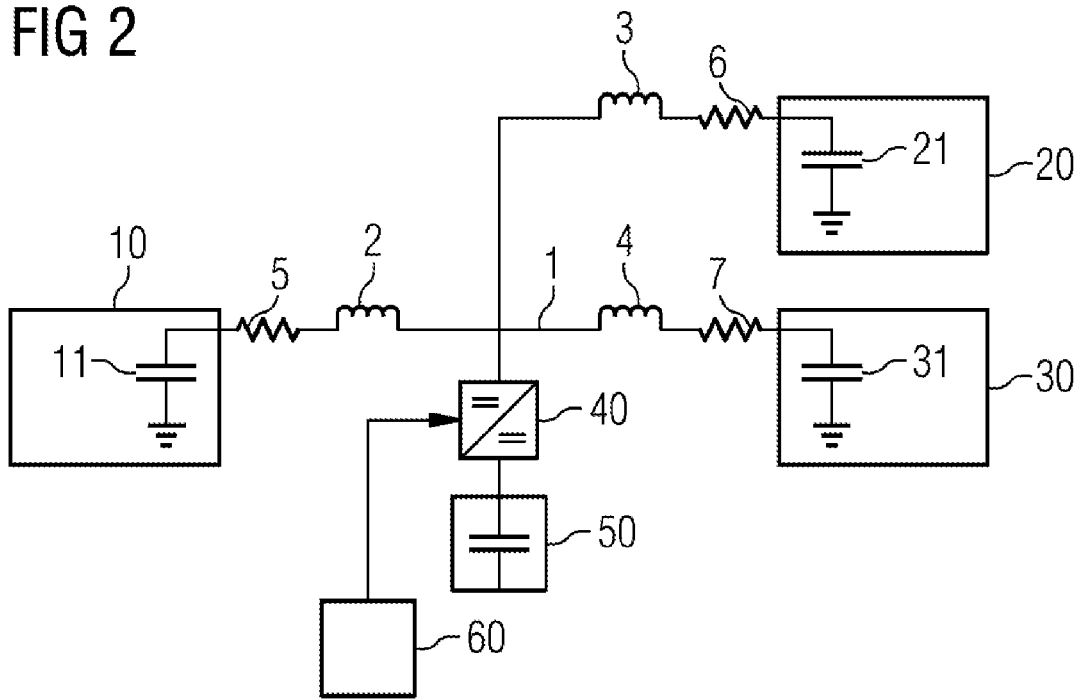
FIG. 2 shows a schematic representation of an exemplary energy supply network, which is configured according to the invention.

The energy supply network according to FIG. 2, additionally to the energy supply network represented in FIG. 1, which is known from the prior art, comprises an energy accumulator 50. The energy accumulator 50 can be a capacitor, a battery, a supercapacitor or a flywheel. The energy accumulator 50 is selectively connectable to the bus line 1 by the control of a switch device 40, by means of a computer unit 60.

As a result of the presence of the additional energy accumulator 50, the storage capacities of the intermediate circuit capacitors 11, 21, 31 of the power electronic converters 10, 20, 30, in comparison with the arrangement which is known from the prior art, can be substantially reduced. The intermediate circuit capacitances are thus configured in the form of commutation capacitances 11, 21, 31, the storage capacity of which is selected such that, in the operation of the energy supply network, a control function of the associated power electronic converter 10, 20, 30 is provided for, and an excess voltage associated with a commutation operation is managed. Conversely, the storage capacity of the energy accumulator 50 is substantially greater than the storage capacity of a respective commutation capacitance 11, 21, 31.

In practice, it is appropriate if the storage capacity of the commutation capacitances 11, 21, 31 lies between 10 µF and 100 µF, particularly between 10 µF and 50 µF. The storage capacity of the energy accumulator 50, conversely, is 1 mF, particularly 10 mF, or higher.

The switch device 40 can be configured in the form of a power electronic converter, e.g. a step-up converter. If the switch device is configured in one of the above-mentioned manners, the latter thus comprises a current limiting unit, in which the power electronic semiconductor switching elements which are respectively provided therein are actuated by the computer unit 60 in an appropriate manner.

Although only one energy accumulator 50 is provided in the exemplary embodiment represented in FIG. 2, in a correspondingly longer bus line 1, a plurality of energy accumulators can be connected to the bus line in a spatially distributed arrangement. Each energy accumulator is connected to the bus line 1 via an associated switch device, which is controllable by means of a single, or a respectively associated computer unit. It is moreover possible for the switch device 40 to be connected to the bus line 1 in a galvanically isolated arrangement, e.g. by the interposition of a transformer.

By the separate provision of an energy accumulator 50, the object for the provision of the resonant frequency in a high range, particularly in the kilohertz range, can be achieved in a simple manner. The higher the resonant frequency, the lower the probability that oscillations will be excited in the energy supply network, in conjunction with load cycles.

By the separation of the individual functions of the intermediate circuit of a respective power electronic converter 10, 20, 30, an optimization of the energy supply network can be achieved. To this end, the intermediate circuit capacitors 11, 21, 31 assume a minimum input/output capacitance, which is described as the commutation capacitance, the magnitude of which is dimensioned such that a voltage ripple is minimized to the extent that an associated control function will operate. This dimensioning is, moreover, sufficient to permit the management of an excess voltage associated with commutation. The functionality of the energy accumulator, conversely, is executed by means of the connectable energy accumulator 50. The switch device 40, for the supply of energy in the event of a network power failure or the intermediate storage of rotational energy associated with energy recovery, assumes the function of stabilizing the energy supply network, in the form of an active filter.

The invention claimed is:

1. An energy supply network, comprising:
   a bus line with a line impedance for energy distribution;
   a number of power electronic converters each having a respective commutation capacitance, a storage capacity of which is selected such that, in the operation of the energy supply network, a controlling of the associated power electronic converter is ensured; and
   an energy accumulator which can be selectively connected to the bus line by controlling a switch device, by means of a computer unit, wherein the storage capacity of the energy accumulator is greater than 1 mF and the storage capacity of a respective commutation capacitance assumes a value between 10 µF and 100 µF.

2. The energy supply network as claimed in claim 1, wherein the energy accumulator is a capacitor, a battery, a supercapacitor or a flywheel.

3. The energy supply network as claimed in claim 1, wherein the switch device is a power electronic converter or a hard- or soft-switching insulated converter.

4. The energy supply network as claimed in claim 1, wherein the switch device comprises a current-limiting unit for the limitation of short-circuit power.

5. The energy supply network as claimed in claim 1, wherein the switch device comprises a filter unit for voltage oscillations.

6. The energy supply network as claimed in claim 1, wherein the switch device is actuatable by means of the computer unit, such that a predefined quantity of energy can be released from the energy accumulator to the bus line.

7. The energy supply network as claimed claim 1, wherein the switch device is configured such that the energy accumulator is galvanically isolated from, or galvanically connected to the bus line.

8. The energy supply network as claimed in claim 1, wherein, in the event of a plurality of energy accumulators, the latter are connected to the bus line in a spatially distributed arrangement, by means of associated switch devices.

9. The energy supply network as claimed in claim 1, wherein the storage capacity of the commutation capacitance assumes a value between 10 µF and 50 µF.

10. The energy supply network as claimed in claim 1, wherein the storage capacity of the energy accumulator is greater than 10 mF.

11. The energy supply network as claimed in claim 3, wherein the power electronic converter comprises a step-up converter or step-down converter.

* * * * *